United States Patent
Mon et al.

(10) Patent No.: US 8,744,914 B2
(45) Date of Patent: *Jun. 3, 2014

(54) MOBILE DEVICE CONSUMER INTERFACE PROCESS AND SYSTEM

(75) Inventors: Felix A. Mon, Jacksonville, FL (US); Robert J. Mackenzie, Enfield, CT (US); Susan Smith Thomas, Gastonia, NC (US); Jason Michael Ackiss, Matthews, NC (US); Maile George, Concord, CA (US); Robert Fleetwood Armstrong, Charlotte, NC (US); Kazi M. Ariff, Quincy, MA (US); Erik Stephen Ross, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 227 days.

This patent is subject to a terminal disclaimer.

(21) Appl. No.: 12/695,838

(22) Filed: Jan. 28, 2010

(65) Prior Publication Data

US 2011/0184820 A1   Jul. 28, 2011

(51) Int. Cl.
*G06Q 20/00*   (2012.01)
*G06Q 40/00*   (2012.01)
*G06Q 20/20*   (2012.01)
*G06Q 20/32*   (2012.01)

(52) U.S. Cl.
CPC .......... *G06Q 20/3272* (2013.01); *G06Q 20/20* (2013.01); *G06Q 20/3276* (2013.01); *G06Q 20/32* (2013.01)
USPC .............................................. 705/16; 705/43

(58) Field of Classification Search
None
See application file for complete search history.

(56) References Cited

U.S. PATENT DOCUMENTS

| | | | | | |
|---|---|---|---|---|---|
| 5,589,855 | A | * | 12/1996 | Blumstein et al. | 345/173 |
| 5,758,322 | A | * | 5/1998 | Rongley | 704/275 |
| 5,762,376 | A | * | 6/1998 | Taskett | 283/57 |
| 7,644,039 | B1 | * | 1/2010 | Magee et al. | 705/43 |
| 7,774,231 | B2 | * | 8/2010 | Pond et al. | 705/15 |
| 7,814,015 | B2 | * | 10/2010 | Benedyk et al. | 705/41 |
| 7,822,688 | B2 | * | 10/2010 | Labrou et al. | 705/67 |
| 7,835,942 | B1 | * | 11/2010 | Pavlic et al. | 705/16 |
| 7,865,448 | B2 | * | 1/2011 | Pizarro | 705/65 |

(Continued)

OTHER PUBLICATIONS

Web link: http://www.reghardware.co.uk/2009/05/25/handset apps for blind/print.html, Phone Apps Help Blind 'see' (video), 2 pages.

(Continued)

*Primary Examiner* — Mussa A Shaawat
(74) *Attorney, Agent, or Firm* — Moore and Van Allen, PLLC; Michael A. Springs; Patrick B. Horne

(57) ABSTRACT

Systems, methods, and computer program products are provided for assisting a consumer during a transaction with a vendor at a point of sale by providing transaction information to the consumer via consumer-readable communications. In one embodiment, a payment terminal proximate the point of sale communicates a transaction information signal to the mobile device. The mobile device communicates the transaction information to the consumer in a consumer-readable format such as audible sound waves. In some embodiments, the consumer-readable communications include requests for consumer input. The consumer input is received by an input device proximate the mobile device and communicated to the payment terminal. In some embodiments consumer input is received by the payment terminal as well as the mobile device, and in some embodiments, the consumer chooses whether to use the mobile device as an interface or only to use the payment terminal.

50 Claims, 5 Drawing Sheets

(56) References Cited

U.S. PATENT DOCUMENTS

| | | | |
|---|---|---|---|
| 2002/0147658 A1* | 10/2002 | Kwan | 705/26 |
| 2002/0181710 A1* | 12/2002 | Adam et al. | 380/270 |
| 2003/0055735 A1* | 3/2003 | Cameron et al. | 705/26 |
| 2003/0074328 A1* | 4/2003 | Schiff et al. | 705/75 |
| 2005/0172148 A1* | 8/2005 | Ying | 713/200 |
| 2007/0174082 A1* | 7/2007 | Singh | 705/1 |
| 2008/0208742 A1* | 8/2008 | Arthur et al. | 705/41 |
| 2008/0257957 A1* | 10/2008 | Steinecker | 235/380 |
| 2008/0270246 A1* | 10/2008 | Chen | 705/17 |
| 2009/0048916 A1* | 2/2009 | Nuzum et al. | 705/14 |
| 2009/0171799 A1* | 7/2009 | Ying | 705/18 |
| 2009/0281904 A1* | 11/2009 | Pharris | 705/17 |
| 2010/0169182 A1* | 7/2010 | Madani | 705/21 |
| 2010/0299212 A1* | 11/2010 | Graylin et al. | 705/14.66 |
| 2010/0312703 A1* | 12/2010 | Kulpati et al. | 705/44 |
| 2011/0087589 A1* | 4/2011 | Chan et al. | 705/39 |
| 2011/0093351 A1* | 4/2011 | Afana | 705/16 |
| 2011/0202465 A1* | 8/2011 | Mashhour | 705/67 |

OTHER PUBLICATIONS

Web link: http://www.knfbreader.com/products-mobile.php; "knfbReader Mobile", 2 pages.

Web link: http//www.maccast.com/2009/07/01/maccast-2009-07-01-iphone-3gs-accessibility/; 6 pages.

Website: http://www.snaptell.com/; 1 page.

Hackman, Mark, "Hands Off with Google Goggles", Dec. 8, 2009, Web link: http://www.pcmag.com/article2/0,2817,2356786,00.asp; 4 pages.

Web link: http://braillebookstore.com/view.php?T=Pocket+Money+Brailler, Product=Pocket Money Brailler; 2 pages.

Pickens, Hugh, "BrainPort Lets the Blind 'See' With Their Tongues"; Web link: http://hardware.slashdot.org/article.pl?sid=09/08/22/2035256; 3 pages.

Caesar, "New Graphic Displays for the Blind", Dec. 22, 2004; Web link: http://www.physorg.com/news2474.html.

Website: http://maxiaids.com/store/prodIndex.asp?idStore=1 [Products for Independent Living: Blind & Low Vision Store]; 2 pages.

MacDonald, Jay (Bankrate.com), "Changes to Currency May Help the Blind", Oct. 13, 2008 Web link: http://bankrate.com/finance/checking/changes-to-currency-may-help-the-blind-1.aspx; 2 pages.

MacDonald, Jay (Bankrate.com), "Changes to Currency May Help the Blind", Oct. 13, 2008 Web link: http://bankrate.com/yho/news/pf/20081013_blind_currency_changes_a2.asp; 2 pages.

O'Brien, Maggie and Jordon, Steve (Omaha World-Herald), "No Single Solution to Blind-Friendly Currency", May 21, 2008, web link: http://www.acb.org./nebraska/legislation/accessible-currency/news-articles/no-single-solution-to-blind-friendly-currency.html; 5 pages.

Web link: www.halfbakery.com/idea/blind_20friendly_20currency; Blind Friendly Currency, 15 pages.

Website: www.acb.org/resources/index.html; American Council of the Blind Helpful Resources for Blind and Visually Impaired Persons, 4 pages.

Web link: www.abledata.com/abledata.cfm?pageid=19327&top=14673&trail=22,13134&discontinued=0, Products: Voice Output Paper Money Identifier, 2 pages.

Vicini, James (Washington, D.C.), "U.S. Court: Currency Discriminates Against the Blind", Web Link: http://www.reuters.com/article/idUSN2030825720080520, 3 pages.

eHow Contributing Writer, Web link: http://www.ehow.com/how_2043858_help-blind-arrange-currency-their.html, 2 pages.

Web link: http://en.wikipedia.org/wiki/Wired_glove [Wired Glove Information]; 3 pages.

\* cited by examiner

MOBILE DEVICE CONSUMER INTERFACE PROCESS AND SYSTEM

FIELD

In general, embodiments of the invention relate to point of sale transactions, and, more particularly, relate to systems, methods, and computer program products for providing a consumer with assistance communicating with the payment terminal of the vendor proximate the point of sale and thereby assisting the consumer during the transaction and with completing the transaction.

BACKGROUND

When engaged in a point-of-sale (POS) transaction, a consumer typically has the opportunity to review information regarding the goods and/or services being purchased on a video display as the products are scanned. The information provided to the consumer may include the name of the product being purchased, the quantity being purchased, the price of the product, discounts applied to the price of the product and other information. In some configurations, the video display is shared by both the cashier and the consumer, and the screen is turned so that both cashier and consumer may view the display. Typically the cashier is behind a counter opposite the consumer. In such a configuration, creating an unobstructed line of sight to the video display for both the cashier and the consumer may prove difficult. In other configurations, a separate video display is provided for both the cashier and the consumer. However, viewing the video display may be difficult or impossible for many consumers, such as consumers with visual impairment. Additionally, use of the video display may be difficult for consumers that are distracted, such as consumers having children. Various other consumers may simply prefer not to read the information provided on the video display.

Furthermore, some consumers, including the visually impaired, may find use of a traditional payment terminal difficult or impossible. For example, payment terminals from one store to the next often look different and have different configurations of user input and output devices. Many consumers must take additional time to find the correct buttons or other input devices on the particular payment terminal and, as a result, check out is slowed. The payment terminals also rarely utilize Braille or other communication systems suited for the visually impaired making it especially difficult for the visually impaired to enter input into the payment terminal.

Therefore, systems and methods are needed to provide alternative ways for communicating transaction information to a consumer and assisting the consumer in providing input to the payment terminal in order to more easily complete the transaction at a POS.

SUMMARY

Systems, methods, and computer program products are provided for assisting a consumer carrying a mobile device during a transaction with a vendor at a point of sale. In accordance with one embodiment of the invention, a method includes establishing a connection between a payment terminal disposed proximate the point of sale and the mobile device. The next step is producing a transaction information signal proximate the payment terminal based at least in part on some or all transaction information, the transaction information signal comprising instructions for producing one or more consumer-readable communications for communicating some or all of the transaction information to the consumer. The third step is communicating the transaction information signal from the payment terminal to the mobile device, and the final step is receiving consumer input proximate the payment terminal, the consumer input provided by the consumer in response to one or more consumer-readable communications communicated to the consumer proximate the mobile device.

In accordance with another embodiment of the invention, a system includes a payment terminal disposed proximate the point of sale. The payment terminal has a communication device configured for establishing a connection with the mobile device and a processing device configured for producing a transaction information signal based at least in part on some or all transaction information, the transaction information signal comprising instructions for producing one or more consumer-readable communications for communicating some or all of the transaction information to the consumer. The communication device is also configured for communicating the transaction information signal to the mobile device and receiving consumer input from the mobile device. The consumer input is provided by the consumer in response to the one or more consumer-readable communications communicated to the consumer proximate the mobile device.

In accordance with another embodiment of the invention, a computer program product has a computer-readable medium having computer-readable instructions. The instructions are intended for execution proximate a payment terminal disposed proximate a point of sale of a vendor for assisting a consumer carrying a mobile device to complete a transaction with the vendor. The instructions include instructions for establishing a connection between the payment terminal and the mobile device and instructions for producing a transaction information signal proximate the payment terminal based at least in part on some or all transaction information. The transaction information signal includes instructions for producing one or more consumer-readable communications for communicating some or all of the transaction information to the consumer. The computer-readable instructions also include instructions for communicating the transaction information signal from the payment terminal to the mobile device and instructions for receiving consumer input from the mobile device proximate the payment terminal. The consumer input is provided by the consumer in response to one or more consumer-readable communications communicated to the consumer proximate the mobile device.

In accordance with another embodiment of the invention, a method includes establishing a connection between the mobile device and a payment terminal disposed proximate the point of sale and receiving a transaction information signal proximate the mobile device and communicated by the payment terminal. The transaction information signal is based at least in part on some or all transaction information, the transaction information signal comprising instructions for producing one or more consumer-readable communications for communicating some or all of the transaction information to the consumer. Next, the method includes communicating some or all of the transaction information to the consumer using the one or more consumer-readable communications and then receiving consumer input in response to the one or more consumer-readable communications proximate the mobile device. Finally, the method includes communicating the consumer input from the mobile device to the payment terminal.

In accordance with another embodiment of the invention, a system includes a mobile device carried by the consumer and configured for connecting to a payment terminal disposed proximate the point of sale. The mobile device includes a communication device configured for receiving a transaction information signal from the payment terminal, and the transaction information signal is based at least in part on some or all transaction information. The transaction information signal includes instructions for producing one or more consumer-readable communications for communicating some or all of the transaction information to the consumer. In this embodiment, the system, and in some embodiments, the mobile device, includes a consumer readable communication device coupled with the mobile device and configured for communicating some or all of the transaction information to the consumer using one or more consumer-readable communications. The system also includes an input device coupled with the mobile device and configured for receiving some or all consumer input in response to the one or more consumer-readable communications proximate the mobile device. The communication device of the mobile device is also configured for communicating the consumer input to the payment terminal.

In accordance with another embodiment of the invention, a computer program product has a computer-readable medium having computer-readable instructions for execution proximate a mobile device carried by a consumer. The instructions include instructions for establishing a connection between the mobile device and a payment terminal disposed proximate the point of sale and instructions for receiving a transaction information signal proximate the mobile device and communicated by the payment terminal. The transaction information signal is based at least in part on some or all transaction information and includes instructions for producing one or more consumer-readable communications for communicating some or all of the transaction information to the consumer. The computer-readable instructions also include instructions for communicating some or all of the transaction information to the consumer using one or more consumer-readable communications and instructions for receiving consumer input in response to the one or more consumer-readable communications proximate the mobile device. Finally, the instructions include instructions for communicating the consumer input from the mobile device to the payment terminal.

BRIEF DESCRIPTION OF THE DRAWINGS

Figure 1:
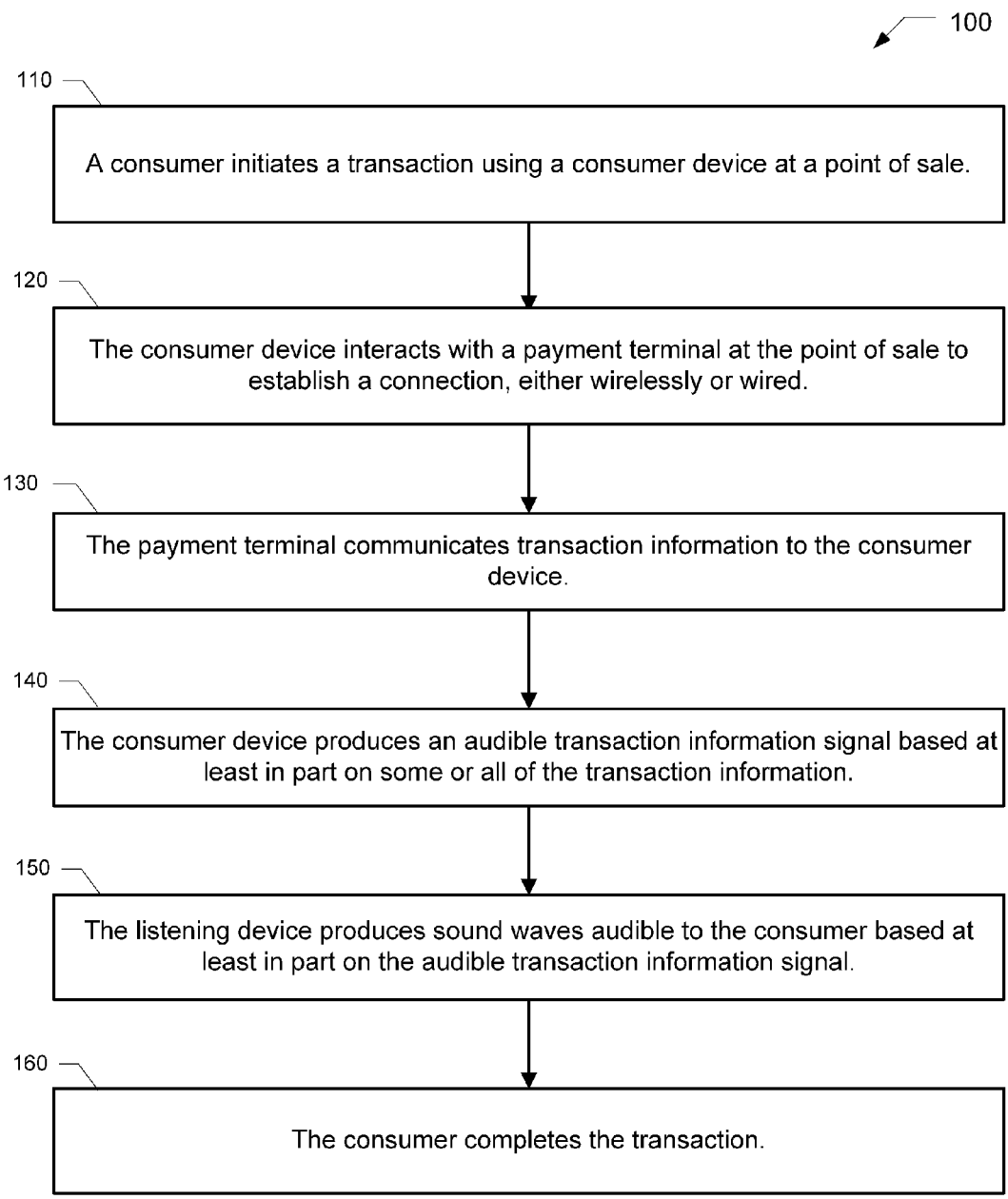
Figure 2:
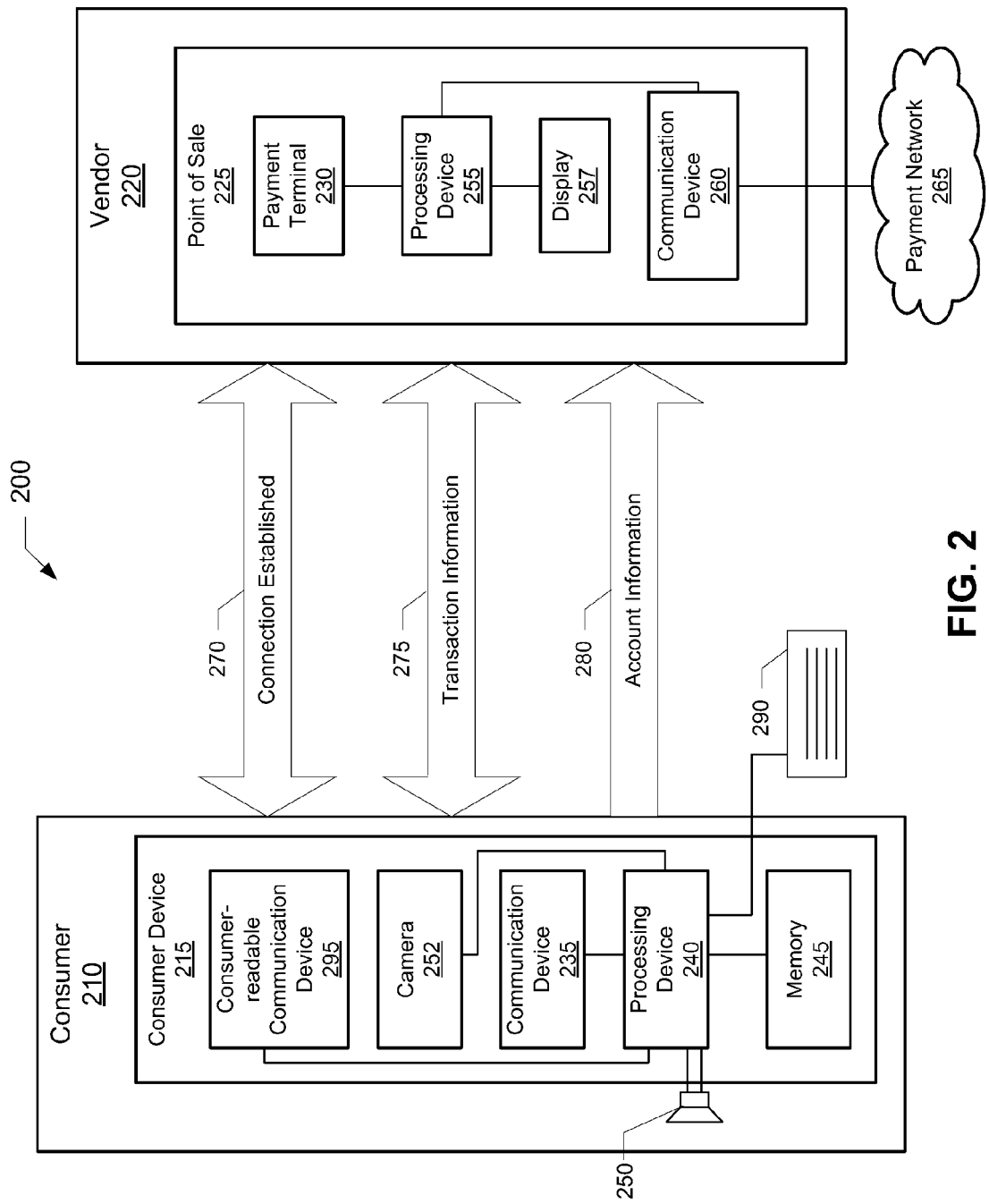
Figure 3:
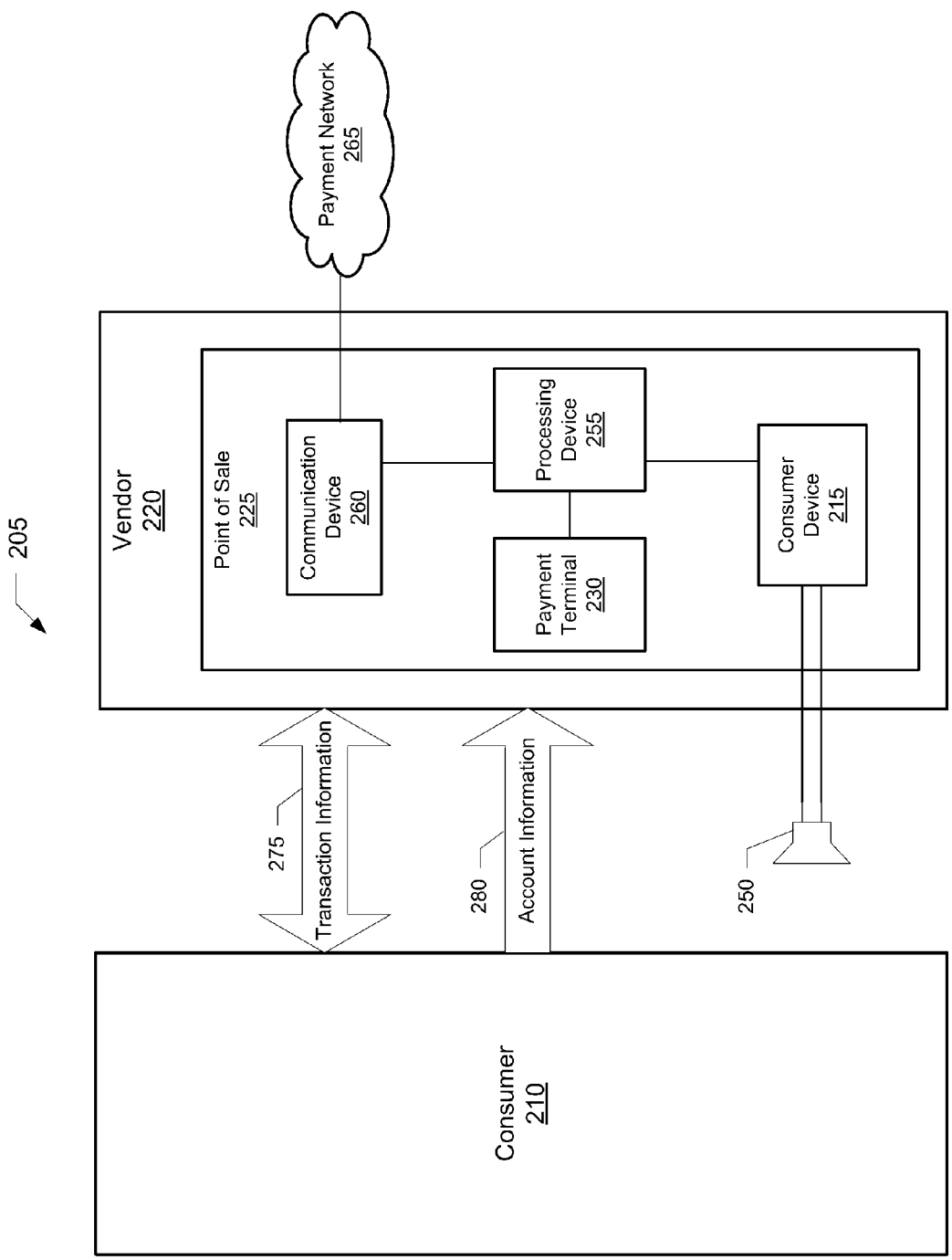
Figure 4:
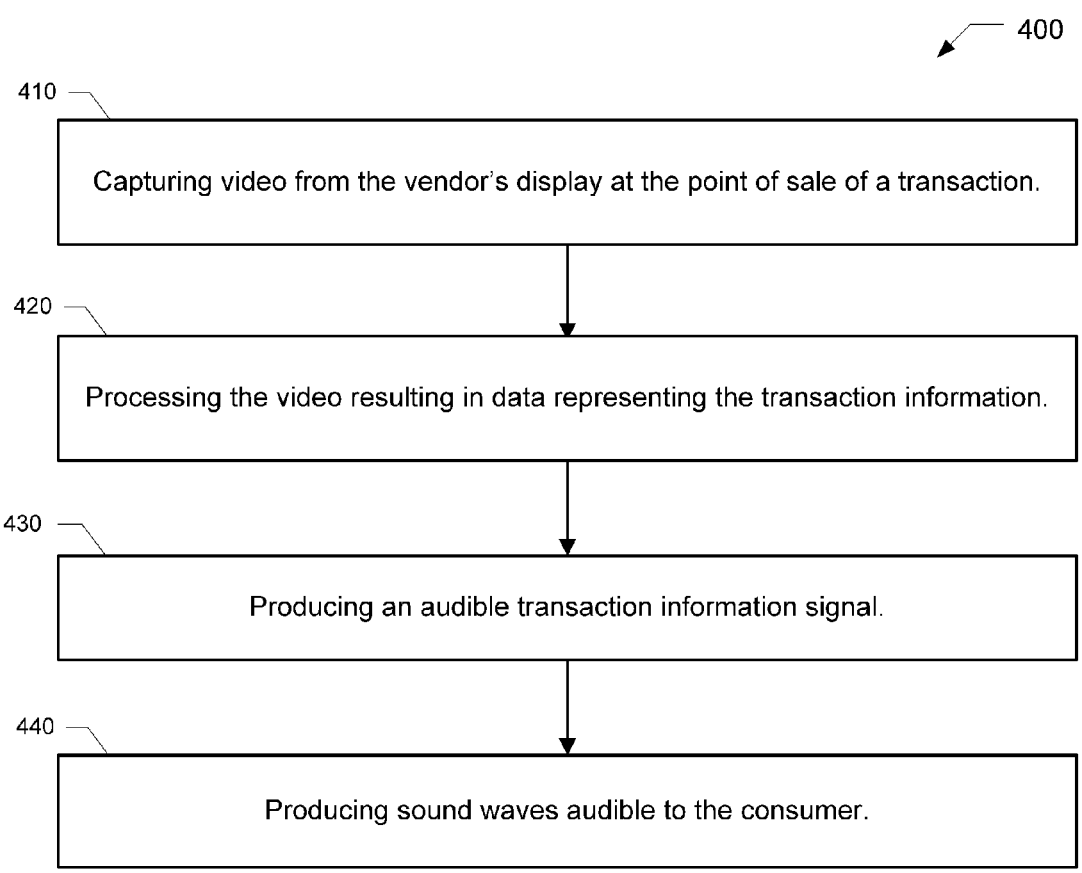

Having thus described embodiments of the invention in general terms, reference will now be made to the accompanying drawings, which are not necessarily drawn to scale, and wherein:

FIG. 1 is a flow diagram illustrating an audible transaction process, in accordance with one embodiment of the present invention;

FIG. 2 is a block diagram providing a more detailed illustration of an audible transaction system, in accordance with one embodiment of the present invention;

FIG. 3 is a block diagram providing a more detailed illustration of an audible transaction system, in accordance with another embodiment of the present invention; and FIG. 4 is a flow diagram illustrating a visual recognition audible transaction process, in accordance with one embodiment of the present invention.

Figure 5:
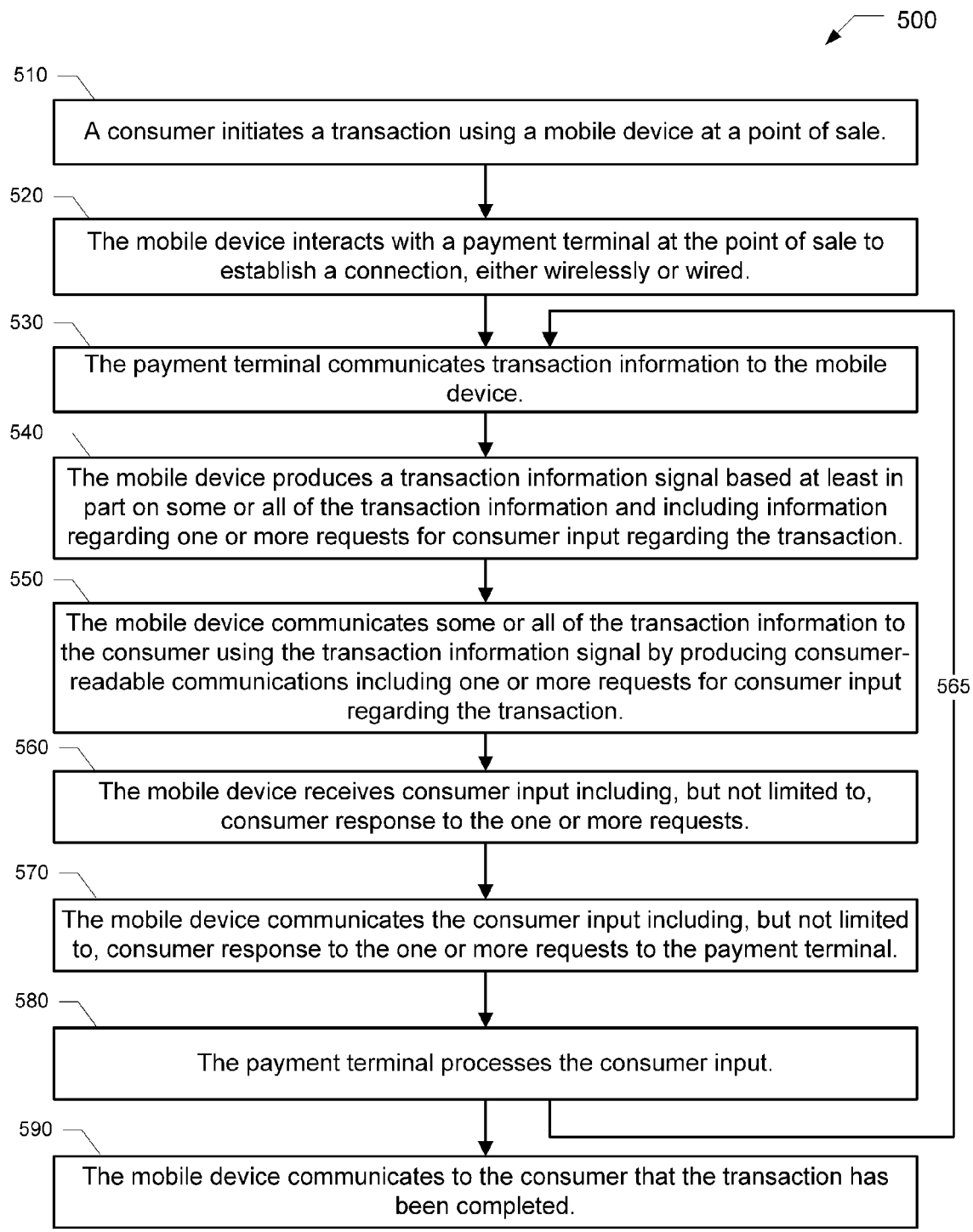

FIG. 5 is a flow diagram illustrating a mobile device consumer interface transaction process, in accordance with one embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 is a flow diagram illustrating an audible transaction process 100 in accordance with one embodiment of the present invention. As represented by block 110, a consumer initiates a transaction using a consumer device at a point of sale. For example, the consumer may initiate a transaction to purchase goods or services from a vendor. In one embodiment, a consumer approaches the point of sale carrying a consumer device such as a cellular phone, smartphone, personal digital assistant (PDA), personal navigation device such as a global positioning system (GPS) receiver, personal music player such as a Moving Picture Experts Group Layer-3 Audio (MP3) player, or the like and requests the purchase of goods and/or services. In some embodiments, the consumer device is a wireless communication device and in others the consumer device is configured for connecting via a wired connection. In some embodiments, the consumer device is part of the point of sale and is not a mobile device carried by the consumer.

As used herein, "transaction" refers to any interaction between a consumer and vendor proximate the vendor's point of sale. For example, a consumer may interact with a payment terminal proximate the point of sale of the vendor in order to receive transaction information and provide consumer input. As used herein, "payment terminal" refers to any terminal proximate the point of sale and operated by the vendor in order to interact with one or more consumers. For example, in some embodiments, a payment terminal may include, but is not limited to, a keypad, a monitor, a card-reading device and the like. In some embodiments, a payment terminal includes one or more of a processing device, a communication device, an input device and other components or one or more of those components are separate from the payment terminal and are configured for communicating with the payment terminal.

As represented by block 120, the consumer device interacts with a payment terminal at the point of sale, via either a wireless or wired connection. In one embodiment the user device is configured for a wired connection. In such a configuration, the consumer physically connects the consumer device with the payment terminal. For example, in one embodiment, the payment terminal includes a universal serial bus (USB) cable for connecting with a consumer device, and the consumer recognizes the cable and connects the consumer device via the USB cable. In other embodiments, the consumer device connects with the payment terminal wirelessly. Such a connection can be initiated by either the consumer device or the payment terminal. For example, in one embodiment the consumer device is a smartphone having wireless communication capabilities. The smartphone recognizes the presence of the payment terminal at the point of sale and begins wireless communication with the payment terminal. In another embodiment the payment terminal at the point of sale recognizes the presence of the consumer device and begins wireless communication with the consumer device.

In some embodiments, the interaction between the consumer device and the payment terminal includes authentication of the identity of the consumer. The type of authentication varies drastically across various points of sale. For example, in one embodiment, the identity of the consumer is authenticated by the consumer using the consumer device to communicate some type of security code such as a PIN number or answer one or more security questions. Authentication can be performed using one security measure or multiple security measures. For example, in one embodiment, two security measures are required. The consumer device, in this example, is a consumer's mobile device and during interaction with the payment terminal, the mobile device communicates identification information to the payment terminal. Additionally, the consumer is prompted by the mobile device, typically upon receipt of instructions from the payment terminal, to enter either a PIN number or some other consumer input tending to identify the consumer. In some embodiments other types of security measures are used such as, but not limited to, biometrics, iris recognition, fingerprinting and the like.

As represented by block 130, once the consumer device and the payment terminal have established a connection, the payment terminal communicates transaction information to the consumer device. For example, a consumer may be purchasing goods from a cashier in a store. As the goods are scanned, the payment terminal communicates information related to the products being scanned, such as information indicating the name of the product being scanned and the price of the product being scanned. Once all the goods have been scanned at the point of sale in order to identify the goods, the payment terminal determines the balance owed for the transaction. Then, the payment terminal communicates transaction information including, but not limited to, product identification information, product quantity information, product pricing information, product discount information, running balance owed information, final balance owed information, and payment method information.

As represented by block 140, the consumer device then produces an audible transaction information signal based at least in part on some or all of the transaction information received from the payment terminal.

As represented by block 150, the listening device produces sound waves audible to the consumer based at least in part on the audible transaction information signal received from the consumer device. In some embodiments, the consumer device includes the listening device for audibly communicating the information to the consumer. In some embodiments, the consumer device includes a listening port such as a headphone jack so that the consumer may receive the audible information via headphones, headset, earphones, ear-buds, hearing assistance devices such as hearing aids or the like. In some embodiments, the listening device includes a personal listening device such as a set of headphones, a headset, earphones, ear-buds, hearing assistance devices such as hearing aids, one or more personal speakers or the like for connecting with the consumer device and providing audible sound waves to the consumer. In other embodiments, the listening device is a public listening device such as one or more public speakers or some other public listening device that publishes sound waves into surrounding areas so that any person proximate the area might listen. Herein a personal speaker refers to a low-output speaker configured for providing audible sound waves predominantly to an individual while minimizing public exposure to the sound waves. A public speaker refers herein to a speaker having a higher output than a personal speaker such that individuals other than the consumer may be exposed to the sound waves it produces. In the private listening embodiments, discretion is maintained because other nearby consumers need not become aware that the consumer is utilizing an audible transaction process 100. For example, as products are being scanned at the point of sale, the consumer device, which is connected with or includes a personal listening device, provides audible information to the consumer without nearby people being exposed to public messages concerning the transaction, thereby maintaining a high degree of discretion.

As represented by block 160, the consumer then completes the transaction. In some embodiments, the consumer device prompts the consumer to provide account information for payment of the balance owed. Then, the consumer may enter bank account information such as credit or debit account information. In some embodiments, the consumer device stores information regarding a particular credit or debit account from which the vendor can obtain payment. In such embodiments, the consumer device can be configured to prompt the consumer to choose the account from which the consumer desires payment to be made, or the consumer device can be configured to automatically provide payment from a predetermined account.

As used herein, a "bank account" refers to a credit account, a debit/deposit account, or the like. Although the phrase "bank account" includes the term "bank," the account need not be maintained by a bank and may, instead, be maintained by other financial institutions. As used herein, unless specifically limited by the context, a "transaction" may refer to a purchase of goods or services, a return of goods or services, a payment transaction, a credit transaction, or other transaction involving the consumer's bank account. As used herein, the term "products" refers to both goods and services.

FIG. 2 is a block diagram providing a more detailed illustration of an audible transaction system 200 in accordance with one embodiment of the invention. In general, the audible transaction system 200 includes a consumer 210 with a consumer device 215 and a vendor 220 having a point of sale 225 including a payment terminal 230. In the embodiment illustrated in FIG. 2A, the consumer device 215 is shown alongside the consumer 210 to indicate that the consumer device 215 is a mobile device that can be transported by the consumer 210. As discussed above, the consumer device 215 can be any number of mobile devices.

In this embodiment, the consumer device 215 includes a communication device 235, a processing device 240, a memory 245, and a listening device 250. In some embodiments, such as the embodiment discussed below with reference to FIG. 4, the consumer device includes a camera 252. In some embodiments, such as the embodiment discussed below with reference to FIG. 5, the consumer device is a mobile device and either includes or is configured for communicating with an input device 290 and a consumer-readable communication device 295. The processing device 240 is connected with and generally controls the operation of the other components of the consumer device 215.

As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities.

As used herein, a "communication device" generally includes a modem, server, transceiver, and/or other device for communicating with other devices directly or via a network, and/or a user interface for communicating with one or more users. As used herein, a "user interface" generally includes a display, mouse, keyboard, button, touchpad, touch screen, microphone, speaker, LED, light, joystick, switch, buzzer, bell, and/or other user input/output device for communicating with one or more users.

As used herein, a "memory device" generally refers to a device or combination of devices including one or more forms of computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

In the embodiment of the invention illustrated in FIG. 2, a processing device 255 is also located at the point of sale 225 and connected with the payment terminal 230. Some embodiments also have a display 257 connected with the payment terminal 230 and/or the processing device 255 for displaying some or all of the transaction information in a visually perceptible format. The processing device 255 is also connected with and controls a communication device 260 configured for communicating with a payment network 265. One of skill in the art will recognize, in view of this disclosure, that one embodiment of the payment network 265 includes communication pathways to and from both an acquiring bank, which manages the vendor's bank account, and an issuing bank, which manages the consumer's credit/debit account.

When the consumer 210 initiates a transaction, such as a payment transaction to pay for a product provided by the vendor 220, or a return transaction for returning a product to the vendor 220, the communication device 235 of the consumer device 215 establishes a connection (arrow 270) with the communication device 260 at the POS 225 of the vendor 220. In the wireless embodiment, this step typically begins with the processing device 240 controlling the communication device 235 so that the communication device 235 "listens" for communications from an outside communication device (such as 260) and/or transmits so that outside communication devices (such as 260) can recognize the presence of the consumer device 215. In one embodiment, radio frequency identification (RFID) devices are used as one or both of the communication devices 235 and 260 or are connected with one or both of the communication devices 235 and 260 to provide indications of the proximity of a consumer device 215 with a payment terminal 230. When communication device 235 recognizes the presence of a POS communication device 260, the connection can be established.

In other embodiments, the consumer device 215 connects via wired connection. For example, the consumer brings a consumer device 215 to the point of sale 225 and manually connects the consumer device 215 with the payment terminal 230 or the communication device 260. In one embodiment discussed above, the point of sale includes a communication device 260 such as a USB port and a USB cable for connecting with the USB port at the point of sale on one end and connecting with the consumer device 215 on the opposite end.

Once the consumer device 215 is connected with the payment terminal 230, the payment terminal 230 communicates transaction information to the consumer device 215 (arrow 275). The communication of transaction information may be prompted in several ways. In a first embodiment, the communication of transaction information is prompted automatically once both initiation of the transaction and a connection is established between the consumer device 215 and the payment terminal 230.

In a second embodiment, a consumer's card may prompt the audible transaction process once it has been swiped by the cashier or the consumer. The card may be swiped before or during the transaction process, and communicates to the payment terminal 230 that an audible transaction process is the consumer's preference. In one embodiment, the consumer's card is a credit/debit card that is being used to transfer account information for tendering payment for the transaction. In another embodiment, the consumer's card is a membership card such as a grocery store discount card. In various embodiments, the consumer card, (credit/debit card, membership card, or some other consumer card) has a memory such as a flash memory with stored consumer preferences indicating that an audible transaction process is preferred to the typical, visually-based transaction process. In various other embodiments, the consumer card indicates to the payment terminal 230, via access to an outside information source such as a remote database perhaps storing preferences for many consumers and maintained by the card-issuer, the consumer's preference for an audible transaction process. With regard to any of these embodiments, the consumer card may be swiped before or during the transaction and indicates to the payment terminal 230 the consumer's desire for an audible transaction process. It will be appreciated that, although a card is described herein, other devices may be used to indicate the consumer's preference for an audible transaction, such as other payment devices including, but not limited to, near-field-communication (NFC) payment devices. In one embodiment, the consumer device 215 is used as a NFC payment device and communicates the consumer's preference for audible transactions.

In a third embodiment, the consumer's preference for an audible transaction process may be prompted by the consumer plugging-in a personal listening device such as headphones, ear-buds or the like to the consumer device 215. When the consumer device 215 is already connected with a payment terminal 230 (arrow 270) upon connection of the personal listening device with the consumer device 215, the consumer device 215 indicates to the payment terminal 230 the consumer's preference for an audible transaction process, which is inferred from the consumer's plugging-in of the personal listening device. In another embodiment, the consumer device 215 prompts the consumer, either with a visual prompt, an audible prompt, a tactile prompt, or a combination of prompts, to choose whether to proceed with an audible transaction process once the personal listening device is connected. Then, the consumer device 215 receives the consumer input, either through speech recognition methods or via an input device, such as a keypad or touch-screen, and communicates the consumer's preference for proceeding with an audible transaction process if the consumer so chooses.

FIG. 3 is a block diagram providing a more detailed illustration of an audible transaction system 205 in accordance with another embodiment of the invention. In this embodiment, the consumer device 215 is located proximate the point of sale 225. In one embodiment, the consumer device 215 includes a pre-connected listening device 250, and in another embodiment, the consumer device 215 is configured for connecting with a listening device 250, such as a personal listening device. For example, in one embodiment, the consumer device 215 includes a headphone jack for connecting with a pair of headphones, which is one embodiment of the listening device 250.

When a consumer 210 initiates a transaction in this embodiment, the consumer 210 can prompt an audible transaction process in several ways. First, the consumer 210 can connect a listening device 250 with the consumer device 215 at the point of sale 225. The listening device 250 can be headphones, ear-buds or some other listening device. Second, the consumer 210 or the cashier can swipe the consumer's card or otherwise read the consumer's payment device or rewards device. As discussed above, the consumer's card can be a credit/debit card, a membership card, or the like. The card or other device either has stored preferences that are provided to the payment terminal 230 or is linked to pre-determined consumer preferences stored external to the system 205. Third, the system 205 can be configured to automatically operate with an audible transaction process. Fourth, the system 205 can prompt the consumer, audibly, visually or otherwise, to specify a preference by providing input either audibly or with some type of user input device such as a keypad, touch-screen or the like.

In another embodiment, the listening device 250 is already connected with the consumer device 215 at the point of sale 225. The listening device 250 in this embodiment can be one or more speakers, headphones, ear-buds or the like. In this embodiment, the second through fourth mechanisms of initiating an audible transaction process discussed above can be used. Specifically, the consumer 210 can swipe a card, indicating the consumer's preference, the system 205 can be automatically configured, or the system 205 can prompt the consumer 210 for input regarding preference.

FIG. 4 is a flow diagram illustrating a visual recognition audible transaction process 400. In this embodiment, the camera 252 of the consumer device 215 is configured for capturing video from the vendor's display 257 at the point of sale 225, as represented by block 410. As used herein the term "video" is an inclusive term intended to refer to one or more videos, one or more still images and/or one or more snapshot images taken from one or more videos. In some embodiments, the consumer device 215 is part of the vendor's point sale 225 as discussed with reference to FIG. 3, and the consumer device 215 includes a camera 252 for capturing the display 257. In other embodiments, the consumer device is separate from the point of sale 225, but the point of sale 225 includes a camera 252 connected with either the payment terminal 230 or the processing device 255 for capturing the video from the display 257. The video on the display 257 typically includes some or all of the transaction information.

For example, in one embodiment, the consumer device 215 includes a camera 252 for capturing the video display, as represented by block 410. The consumer 210 places the consumer device 215 within visual range of the vendor's display 257, and the camera 252 captures the video. The next step in the process, represented by block 420 is processing the video resulting in data representing the transaction information. This step is performed either by the consumer device 215 after capturing the video, or in embodiments where the camera 252 is part of the point of sale 225, by the processing device 255 at the point of sale 225. This may include performing an algorithm to convert any textual information captured from the display 257 into data representing the transaction information in an audible format. In this regard, some embodiments of the consumer device 215 include an image character recognition application stored in the memory 245 for processing video received from the camera, identifying transaction information therefrom, and converting the transaction information into an audio signal. In some embodiments, the camera 252 captures still images or screenshots from the display 257. In some of these embodiments, some or all captured still images are analyzed in order to discern any data representing transaction information.

The data representing the transaction information is then used to produce an audible transaction information signal as represented by block 430. Step 430 is performed by the processing device 240 of the consumer device 215 in embodiments where the camera 252 is part of the consumer device 215, and is performed by the processing device 255 at the point of sale in embodiments where the camera 252 is part of the point of sale 225. Finally, as represented by block 440, the audible transaction information signal is used to produce sound waves audible to the consumer 210. The listening device 250 receives the audible transaction information signal and produces sound waves audible to the consumer 210.

Referring now to FIG. 5, a flowchart of a mobile device consumer interface transaction process 500 in accordance with one embodiment of the invention is illustrated. As represented by block 510, a consumer initiates a transaction using a mobile device at a point of sale. As discussed above with reference to FIG. 1, the consumer approaches the point of sale carrying a device, which in this embodiment is a mobile device such as a cellular phone, smartphone, PDA, personal navigation device such as a GPS receiver, personal music player such as an MP3 player, or the like. The consumer then initiates a transaction by requesting purchase of goods and/or services.

As represented by block 520, the mobile device then interacts with a payment terminal at the point of sale to establish a connection, via either a wireless or wired connection as discussed above with reference to FIG. 1. When the mobile device is connecting wirelessly with the payment terminal, the connection can be initiated by either the mobile device or the payment terminal as discussed above. As discussed above with reference to FIG. 1, the interaction between the mobile device and the payment terminal includes authentication of the identity of the consumer in some embodiments.

As represented by block 530, once the mobile device and the payment terminal have established a connection, the payment terminal communicates transaction information to the mobile device. The transaction information may include, but is not limited to, product identification information, product quantity information, product pricing information, product discount information, running balance owed information, final balance owed information, and payment method information. In some embodiments, the transaction information also includes one or more requests for consumer input regarding some aspect of the transaction. For example, in one embodiment, as part of the transaction process, the vendor allows the consumer to request cash back to be drawn from the debit account the consumer is using to pay for a purchase of products. In this example, the transaction information includes information indicating that the cash back option is available and giving the consumer the option to choose whether he or she would like cash back. The transaction information, in some embodiments, also includes details concerning the cash back option such as the several levels of cash back from which the consumer will be allowed to choose.

As represented by block 540, the mobile device then produces a transaction information signal based at least in part on some or all of the transaction information and, in some embodiments, including information regarding one or more requests for consumer input regarding the transaction. In some embodiments, the payment terminal, rather than the mobile device produces the transaction information signal and then communicates the transaction information signal to the mobile device in conjunction or in place of step 530. In some embodiments, the transaction information signal is an analog signal and in others it is a digital signal or a combination of the two as discussed in greater detail below.

Next, as represented by block 550, the mobile device communicates some or all of the transaction information to the consumer using the transaction information signal by producing consumer-readable communications via the consumer-readable communication device 295 shown in FIG. 2. The transaction information signal, in some embodiments, includes instructions for producing consumer-readable communications. The instructions, in some embodiments, are digital instructions that can be processed and used to produce the consumer-readable communications. In other embodiments, the instructions are analog instructions that can be received by a consumer-readable communication device and used to produce consumer-readable communications without additional processing.

For example, in one embodiment, the payment terminal produces the transaction information signal in an analog format including instructions for a listening device such as a speaker. The payment terminal communicates the transaction information signal to the mobile device and the mobile device produces the consumer-readable communication, that is, sound waves audible to the consumer, via a speaker either integral or connected with the mobile device. In another embodiment, for example, the payment terminal produces the transaction information signal in a digital format including instructions for a tactile communication device such as a Braille device to produce a consumer-readable communication. The payment terminal communicates the transaction information signal to the mobile device, which then processes the signal and produces a consumer-readable communication using a tactile communication device either integral to the mobile device or connected with the mobile device.

The consumer-readable communications, in various embodiments, include one or more requests for consumer input regarding the transaction. In some embodiments, the request(s) is/are related to the transaction information, and in some embodiments, the requests are unrelated to the transaction information. For example, in some embodiments, the requests include requests for the consumer's personal information so that demographic information may be compiled and later analyzed.

As used herein, "consumer-readable communications" refers to any communication(s) produced by the consumer-readable communication device 295 of FIG. 2 and recognizable by the consumer via the consumer's senses. Such consumer-readable communications take many different forms, including, but not limited to visual communications such as video from a display of the mobile device, audible communications such as sound waves produced by a listening device, either personal or public, either part of the mobile device or separate, and tactile communications, such as those produced by a Braille-creating device, either part of the mobile device or separate. In some embodiments, the consumer-readable communications include communications intended to illicit a response from the consumer's sense of taste and/or sense of smell using a taste-creating device and/or a smell-creating device. In such embodiments, for example, the mobile device may include one or more chemical stores that are provided to the consumer based on the transaction information. For example, in one embodiment, the mobile device includes chemical stores for approximating the flavor and/or smell of two types of food products. The mobile device communicates with flavor and/or smell, and thereafter provides the consumer a choice between the two types of food products. In these various embodiments, the display, listening device, Braille-creating device, smell-creating device and/or taste-creating device are all examples of consumer-readable communication devices 295, but these examples are not exhaustive. Any device that produces a consumer-readable communication as defined above is considered a "consumer-readable communication device" as used herein.

As represented by block 560, the mobile device next receives consumer input including, but not limited to, consumer response to the one or more requests included in the consumer-readable communications of step 550. Consumer input is received via input device 290 shown in FIG. 2. The input device 290 may be part of the mobile device or may be separate and configured for communicating with the mobile device. The input device 290, in various embodiments, includes or is a keyboard, a touch-screen, a roller-ball, one or more buttons, a microphone configured for receiving audible input, a mouse, a touch-pad, an eye-movement sensing device configured for receiving input such as a pair of eye-glasses for measuring eye movement, one or more motion sensing devices such as one or more accelerometers configured for receiving input based on movement of the input device by the consumer, or any other device configured for receiving consumer input. For example, in one embodiment, the mobile device has communicated to the consumer by producing a consumer-readable communication (step 550) the option for cash-back during the course of a pending transaction. The consumer is prompted, via the consumer-readable communication, to input the consumer's choice whether to receive cash back. The consumer is given the option of choosing "yes" or "no." In some embodiments, the consumer-readable communication indicates to the consumer that his or her answer may be spoken. In others, the communication indicates to the consumer that his or her answer may be typed into a keyboard or touch-screen device or entered physically in some other manner. The mobile device then receives the consumer's input regarding whether the consumer prefers cash back during the transaction.

In some embodiments of the process 500, as represented by arrow 565, several steps are repeated based on the interaction between the consumer, the mobile device and the payment terminal. For example, in some embodiments, steps 530-580 are repeated one or more times.

As represented by block 570, once the mobile device has received consumer input, the mobile device communicates to the payment terminal the consumer input including, but not limited to, consumer response to the one or more requests. Next, as represented by block 580, the payment terminal processes the consumer input. For example, in one embodiment, the payment terminal processes the consumer input indicating a positive desire for cash back. The payment terminal determines that the process should revert to step 530 in order to communicate the cash back levels available to the consumer and receive consumer input regarding desired level. In some embodiments, once all necessary iterations of the process have been completed, the mobile device communicates to the consumer that the transaction has been completed as represented by block 590.

In one exemplary embodiment of the invention described above with reference to FIGS. 2 and 5, the payment terminal is configured to communicate information to the mobile device that can be used by the mobile device to present the same information to the consumer through user interface devices integral with or coupled to the mobile device as is or would otherwise be presented to the consumer through the payment terminal display or other user interface devices. In some embodiments, this information presented to the consumer requires a response from the consumer and the consumer can enter the response using the user interface device(s) integral with or coupled to the consumer's mobile device. In this way a consumer with a sensory impairment may be able to use his or her own device, which may be specially configured or at least familiar to the consumer, to receive and send communications to and from the payment terminal.

For example, in one embodiment, a consumer having a visual impairment is checking out at a grocery store and, when it is time to make payment, the payment terminal communicates wirelessly with the consumer's cell phone information including the total purchase amount and a request to select a method of payment from several available options. The consumer's cell phone may generate an audio signal to present this information to the consumer through headphones coupled to the cell phone. In response, the consumer may use the familiar keypad of the consumer's cell phone or a voice recognition feature of the cell phone to make a selection of a payment method. The cell phone then communicates the selection to the payment terminal. The consumer may then swipe a debit or credit card through a card reader of the payment terminal and, in response, the payment terminal may send a signal to the consumer's cell phone that causes the cell phone to present audio to the consumer asking the consumer to enter a personal identification number (PIN). The consumer can then use the cell phone's user input devices to enter a PIN.

In some embodiments of the invention, the payment terminal always wirelessly communicates the same information that is presented through its display or other consumer interface devices within some small radius of the payment terminal and always enables a mobile device in that radius to communicate consumer input back to the payment terminal. In other embodiments, however, communication between the consumer's mobile device and the payment terminal is only triggered by some event, such as input by a customer service person at the point of sale or recognition of a consumer preference associated with the consumer's rewards card or bank card.

In some embodiments of the invention, the payment terminal communicates the same information to the consumer's mobile device that is displayed to the consumer on the point of sale's display so that the information can be presented to the consumer using both the point of sale's display and the mobile device. In other embodiments, however, the payment terminal does not display the information on the payment terminal's display if the information is instead communicated to the consumer's mobile device. Likewise, in some embodiments of the invention, the payment terminal can receive consumer input from either the consumer's mobile device or the point of sale's user input devices, while, in other embodiments, the payment terminal can only receive certain consumer input from the mobile device once communication is initiated between the consumer's mobile device and the payment terminal.

As will be appreciated by one of skill in the art, the present invention may be embodied as a method, apparatus (including a system), computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system."

Furthermore, embodiments of the present invention may take the form of a computer program product comprising a computer-readable storage medium having computer-usable program code/computer-readable instructions embodied in the medium. Any suitable computer-readable medium may be utilized. The computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet.

Computer-readable instructions for carrying out operations of the present invention may be written in an object-oriented, scripted or unscripted programming language such as Java Perl, Smalltalk, C++, or the like. However, the computer-readable instructions for carrying out operations of the invention may also be written in conventional procedural programming languages, such as the "C" programming language or similar programming languages.

Embodiments of the present invention are described above with reference to flowchart illustrations and/or block diagrams of methods, apparatuses (systems) and computer program products according to embodiments of the invention. It will be understood that each block of the flowchart illustrations and/or block diagrams shown in FIGS. 1-4, and combinations of blocks in the flowchart illustrations and/or block diagrams, can be implemented by computer-readable instructions. These computer-readable instructions may be provided to a processor of a general purpose computer, a special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer-readable program instructions may also be stored in a computer-readable memory that can direct a computer or other programmable data processing apparatus to function in a particular manner, such that the instructions stored in the computer-readable memory produce an article of manufacture including instruction mechanisms which implement the function/act specified in the flowchart and/or block diagram block or blocks.

The computer-readable program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for assisting a consumer carrying a mobile device during a transaction with a vendor at a point of sale, the method comprising:
using a computer processor operating computer program code instructions stored in a non-transitory computer-readable medium, wherein the computer program code instructions are structured to cause the computer processor to:
establish a connection between a payment terminal disposed proximate the point of sale and the mobile device;
in response to establishing the connection between the payment terminal and the mobile device and without contemporaneous input from the consumer, receive a transaction process preference from the mobile device at the payment terminal, wherein the transaction process preference comprises an audible transaction process preference corresponding to the consumer and wherein the audible transaction process preference is a preference predetermined by the consumer and stored in the mobile device for communication to any payment terminal that establishes a connection with the mobile device;
determine that the transaction process preference comprises the audible transaction process preference corresponding to the consumer, the audible transaction process preference stored in a memory of the mobile device and indicating to the payment terminal the consumer's predetermined preference for an audible transaction process rather than a traditional visual transaction process;
produce, in response to determining the consumer's audible transaction process preference, using the communication device of the payment terminal, a transaction information signal proximate the payment terminal based at least in part on some or all transaction information, the transaction information signal comprising instructions for producing one or more consumer-readable communications for communicating some or all of the transaction information to the consumer;
initiate a communication of the transaction information signal from the payment terminal to the mobile device; and
receive consumer input proximate the payment terminal, the consumer input provided by the consumer in response to one or more consumer-readable communications communicated to the consumer proximate the mobile device.

2. The method of claim 1 wherein the computer processor is further configured to process the consumer input to determine whether additional iterations of the method are necessary, and if not, produce a transaction complete signal comprising instructions for producing a consumer-readable communication indicating that the transaction has been completed and communicating the transaction complete signal from the payment terminal to the mobile device.

3. The method of claim 1 wherein the transaction information signal comprises instructions for producing one or more consumer-readable communications comprising one or more requests for consumer input.

4. The method of claim 3 wherein the one or more requests for consumer input comprise one or more selected from the group consisting of one or more requests for consumer input regarding the transaction, one or more requests for consumer input unrelated to completing the transaction, and one or more requests for personal information unrelated to the transaction.

5. The method of claim 1 wherein the transaction information comprises at least one selected from the group consisting of product identification information, product quantity information, product pricing information, product discount information, running balance owed information, final balance owed information, and payment method information.

6. The method of claim 1 wherein one or more of the one or more consumer-readable communications comprise one or more selected from the group consisting of an audible communication, a visual communication, a tactile communication, a smell-stimulating communication and a taste-stimulating communication.

7. The method of claim 1 wherein receiving the consumer input proximate the payment terminal comprises receiving consumer input accepted from the consumer proximate the mobile device and communicated from the mobile device to the payment terminal.

8. The method of claim 1 wherein the computer processor is further configured to provide the consumer an option to interact directly with the payment terminal, the option to interact indirectly with the payment terminal through the mobile device, or the option to interact both directly with the payment terminal and indirectly with the payment terminal through the mobile device.

9. The method of claim 1 wherein receiving the consumer input proximate the payment terminal comprises:
receiving consumer input accepted from the consumer proximate the mobile device and communicated from the mobile device to the payment terminal and receiving consumer input accepted from the consumer proximate the payment terminal.

10. A system for assisting a consumer carrying a mobile device during a transaction with a vendor at a point of sale, the system comprising:
a payment terminal disposed proximate the point of sale, the payment terminal comprising:
a communication device configured for establishing a connection with the mobile device;
a processing device configured for, in response to establishing the connection between the payment terminal and the mobile device and without contemporaneous input from the consumer, receiving a transaction process preference from the consumer device at the payment terminal, wherein the transaction process preference comprises an audible transaction process preference corresponding to the consumer and wherein the audible transaction process preference is a preference predetermined by the consumer and stored in the mobile device for communication to any payment terminal that establishes a connection with the mobile device; determining that the transaction process preference comprises the audible transaction process preference stored in a memory of the mobile device and corresponding to the consumer, the audible transaction process preference indicating to the payment terminal the consumer's predetermined preference for an audible transaction process rather than a traditional visual transaction process; and, in response to determining the consumer's audible transaction process preference, producing a transaction information signal based at least in part on some or all transaction information, the transaction information signal comprising instructions for producing one or more consumer-readable communications for communicating some or all of the transaction information to the consumer; and
wherein the communication device is further configured for communicating the transaction information signal to the mobile device and receiving consumer input from the mobile device, the consumer input provided by the consumer in response to the one or more consumer-readable communications communicated to the consumer proximate the mobile device.

11. The system of claim 10 wherein the processing device of the payment terminal is further configured for processing the consumer input to determine whether additional input from the consumer is required to complete the transaction, and if not, producing a transaction complete signal comprising instructions for producing a consumer-readable communication indicating that the transaction has been completed and wherein the communication device is further configured for communicating the transaction complete signal to the mobile device.

12. The system of claim 10 wherein the one or more consumer-readable communications comprise one or more requests for consumer input.

13. The system of claim 12 wherein the one or more requests for consumer input comprise one or more selected from the group consisting of one or more requests for consumer input regarding the transaction, one or more requests for consumer input unrelated to completing the transaction, and one or more requests for personal information unrelated to the transaction.

14. The system of claim 10 wherein the payment terminal comprises an input device configured for receiving some or all the consumer input in response to the one or more consumer-readable communications.

15. The system of claim 10 further comprising an input device separate from and in communication with the payment terminal and configured for receiving some or all the consumer input in response to the one or more consumer-readable communications.

16. The system of claim 14 wherein the input device of the payment terminal comprises one or more devices selected from the group consisting of a keyboard, a touch-screen, a roller-ball, one or more buttons, a microphone, a mouse, a touch-pad, an eye-movement sensing device, and a motion-sensing device.

17. The system of claim 15 wherein the input device comprises one or more devices selected from the group consisting of a keyboard, a touch-screen, a roller-ball, one or more buttons, a microphone, a mouse, a touch-pad, an eye-movement sensing device, and a motion-sensing device.

18. The system of claim 10 wherein the transaction information comprises at least one selected from the group consisting of product identification information, product quantity information, product pricing information, product discount information, running balance owed information, final balance owed information, and payment method information.

19. The system of claim 10 wherein one or more of the one or more consumer-readable communications comprise one or more selected from the group consisting of an audible communication, a visual communication, a tactile communication, a smell-stimulating communication and a taste-stimulating communication.

20. A computer program product comprising a non-transitory computer-readable medium, the computer-readable medium having computer-executable program code stored therein, the program code for execution proximate a payment terminal disposed proximate a point of sale of a vendor for assisting a consumer carrying a mobile device during a transaction with the vendor, the program code comprising:

instructions for establishing a connection between the payment terminal and the mobile device;

instructions for, in response to establishing the connection between the payment terminal and the mobile device and without contemporaneous input from the consumer, receiving a transaction process preference from the mobile device at the payment terminal, wherein the transaction process preference comprises an audible transaction process preference corresponding to the consumer and wherein the audible transaction process preference is a preference predetermined by the consumer and stored in the mobile device for communication to any payment terminal that establishes a connection with the mobile device;

instructions for determining that the transaction process preference comprises the audible transaction process preference corresponding to the consumer, the audible transaction process preference stored in a memory of the mobile device and indicating to the payment terminal the consumer's predetermined preference for an audible transaction process rather than a traditional visual transaction process;

instructions for producing, in response to determining the consumer's audible transaction process preference, a transaction information signal proximate the payment terminal based at least in part on some or all transaction information, the transaction information signal comprising instructions for producing one or more consumer-readable communications for communicating some or all of the transaction information to the consumer;

instructions for communicating the transaction information signal from the payment terminal to the mobile device; and instructions for receiving consumer input from the mobile device proximate the payment terminal, the consumer input provided by the consumer in response to one or more consumer-readable communications communicated to the consumer proximate the mobile device.

21. The computer program product of claim 20 wherein the instructions for producing one or more consumer-readable communications comprise instructions for producing one or more consumer-readable communications selected from the group consisting of an audible communication, a visual communication, a tactile communication, a smell-stimulating communication and a taste-stimulating communication.

22. The computer program product of claim 20 wherein the computer-readable instructions further comprise instructions for providing the consumer an option to interact directly with the payment terminal, the option to interact indirectly with the payment terminal through the mobile device, or the option to interact both directly with the payment terminal and indirectly with the payment terminal through the mobile device.

23. A method for assisting a consumer carrying a mobile device during a transaction with a vendor at a point of sale, the method comprising:

using a computer processor operating computer program code instructions stored in a non-transitory computer-readable medium, wherein the computer program code instructions are structured to cause the computer processor to:

establish a connection between the mobile device and a payment terminal disposed proximate the point of sale;

in response to establishing the connection between the payment terminal and the mobile device and without contemporaneous input from the consumer, send a transaction process preference comprising an audible transaction process preference stored in a memory of the mobile device from the mobile device to the payment terminal, wherein the audible transaction process preference is a preference predetermined by the consumer and stored in the mobile device for communication to any payment terminal that establishes a connection with the mobile device;

receive a transaction information signal proximate the mobile device and communicated by the payment terminal, in response to the terminal receiving the transaction process preference from the mobile device and determining that the transaction process preference comprises the consumer's audible transaction process preference corresponding to the consumer, the audible transaction process preference indicating to the terminal the consumer's predetermined preference for an audible transaction process rather than a traditional visual transaction process, the transaction information signal based at least in part on some or all transaction information, the transaction information signal comprising instructions for producing one or more consumer-readable communications for communicating some or all of the transaction information to the consumer; communicating some or all of the transaction information to the consumer using the one or more consumer-readable communications;

receive consumer input in response to the one or more consumer-readable communications proximate the mobile device; and communicate the consumer input from the mobile device to the payment terminal.

24. The method of claim 23 wherein the computer processor is further to:

receive a transaction complete signal proximate the mobile device and communicated by the payment terminal, the transaction complete signal comprising instructions for producing a consumer-readable transaction complete communication for indicating to the consumer that the transaction is complete and communicating the consumer-readable transaction complete communication to the consumer.

25. The method of claim 23 wherein the one or more consumer-readable communications comprise one or more requests for consumer input.

26. The method of claim 25 wherein the one or more requests for consumer input comprise one or more selected from the group consisting of one or more requests for consumer input regarding the transaction, one or more requests for consumer input unrelated to completing the transaction, and one or more requests for personal information unrelated to the transaction.

27. The method of claim 1 wherein the mobile device comprises an input device and some or all the consumer input is received by the input device.

28. The method of claim 1 wherein some or all the consumer input is received by an input device separate from and in communication with the mobile device and wherein the method further comprises communicating some or all of the consumer input from the input device to the mobile device.

29. The method of claim 27 wherein the input device comprises one or more devices selected from the group consisting of a keyboard, a touch-screen, a roller-ball, one or more buttons, a microphone, a mouse, a touch-pad, an eye-movement sensing device, and a motion-sensing device.

30. The method of claim 28 wherein the input device comprises one or more devices selected from the group consisting of a keyboard, a touch-screen, a roller-ball, one or more buttons, a microphone, a mouse, a touch-pad, an eye-movement sensing device, and a motion-sensing device.

31. The method of claim 23 wherein the mobile device comprises a consumer-readable communication device and wherein some or all of the consumer-readable communications are communicated to the consumer by the consumer-readable communication device.

32. The method of claim 23 wherein a consumer-readable communication device separate from and in communication with the mobile device and wherein some or all of the consumer-readable communications are communicated to the consumer by the consumer-readable communication device.

33. The method of claim 23 wherein the transaction information comprises at least one selected from the group consisting of product identification information, product quantity information, product pricing information, product discount information, running balance owed information, final balance owed information, and payment method information.

34. The method of claim 23 wherein one or more of the one or more consumer-readable communications comprise one or more selected from the group consisting of an audible communication, a visual communication, a tactile communication, a smell-stimulating communication and a taste-stimulating communication.

35. A system for assisting a consumer during a transaction with a vendor at a point of sale, the system comprising:

a mobile device carried by the consumer and configured for connecting to a payment terminal disposed proximate the point of sale, the mobile device comprising:

a communication device configured for, in response to establishing the connection between the payment terminal and the mobile device and without contemporaneous input from the consumer, sending a transaction process preference comprising an audible transaction process preference stored in a memory of the mobile device from the mobile device to the payment terminal, wherein the audible transaction process preference is a preference predetermined by the consumer and stored in the mobile device for communication to any payment terminal that establishes a connection with the mobile device, the communication device further configured for receiving a transaction information signal from the payment terminal in response to the terminal receiving the transaction process preference from the mobile device and determining that the transaction process preference comprises the consumer's audible transaction process preference corresponding to the consumer, the audible transaction process preference indicating to the terminal the consumer's predetermined preference for an audible transaction process rather than a traditional visual transaction process, the transaction information signal based at least in part on some or all transaction information, the transaction information signal comprising instructions for producing one or more consumer-readable communications for communicating some or all of the transaction information to the consumer; and the system further comprising:

a consumer readable communication device coupled with the mobile device and configured for communicating some or all of the transaction information to the consumer using one or more consumer-readable communications; and an input device coupled with the mobile device and configured for receiving some or all consumer input in response to the one or more consumer-readable communications proximate the mobile device; and wherein the communication device of the mobile device is further configured for communicating the consumer input to the payment terminal.

36. The system of claim 35 wherein the communication device is further configured for receiving a transaction complete signal comprising instructions for producing a consumer-readable transaction complete communication indicating that the transaction has been completed and wherein the consumer-readable communication device is further configured for communicating the consumer-readable transaction complete communication to the consumer.

37. The system of claim 35 wherein the one or more consumer-readable communications comprise one or more requests for consumer input.

38. The system of claim 37 wherein the one or more requests for consumer input comprise one or more selected from the group consisting of one or more requests for consumer input regarding the transaction, one or more requests for consumer input unrelated to completing the transaction, and one or more requests for personal information unrelated to the transaction.

39. The system of claim 35 wherein the input device is separate from the mobile device and in communication with the mobile device.

40. The system of claim 35 wherein the mobile device comprises the input device.

41. The system of claim 35 wherein the input device comprises one or more devices selected from the group consisting of a keyboard, a touch-screen, a roller-ball, one or more buttons, a microphone, a mouse, a touch-pad, an eye-movement sensing device, and a motion-sensing device.

42. The system of claim 35 wherein the mobile device comprises a consumer-readable communication device configured for communicating some or all of the transaction information to the consumer using one or more consumer-readable communications.

43. The system of claim 35 wherein the consumer-readable communication device is separate from and in communication with the mobile device.

44. The system of claim 35 wherein the mobile device comprises the consumer-readable communication device.

45. The system of claim 35 wherein the consumer-readable communication device comprises one or more devices selected from the group consisting of a private listening device, a public listening device, a display, a tactile communication device, a smell-creating device, and a taste-creating device.

46. The system of claim 35 wherein the transaction information comprises at least one selected from the group consisting of product identification information, product quantity information, product pricing information, product discount information, running balance owed information, final balance owed information, and payment method information.

47. The system of claim 35 wherein the mobile device is selected from the group consisting of a smartphone, a personal digital assistant, a personal global positioning system receiver, a cellular phone, and a personal music player.

48. A computer program product comprising a non-transient computer-readable medium, the computer-readable medium having computer-executable program code stored therein for execution proximate a mobile device carried by a consumer, the computer program product for assisting the consumer during a transaction with a vendor at a point of sale, the program code comprising:
    instructions for establishing a connection between the mobile device and a payment terminal disposed proximate the point of sale;
    instructions for, in response to establishing the connection between the payment terminal and the mobile device and without contemporaneous input from the consumer, sending a transaction process preference comprising an audible transaction process preference stored in a memory of the mobile device from the mobile device to the payment terminal, wherein the audible transaction process preference is a preference predetermined by the consumer and stored in the mobile device for communication to any payment terminal that establishes a connection with the mobile device, the instructions further for receiving a transaction information signal proximate the mobile device and communicated by the payment terminal in response to the terminal receiving the transaction process preference from the mobile device and determining that the transaction process preference comprises the consumer's audible transaction process preference corresponding to the consumer, the audible transaction process preference indicating to the terminal the consumer's predetermined preference for an audible transaction process rather than a traditional visual transaction process, the transaction information signal based at least in part on some or all transaction information, the transaction information signal comprising instructions for producing one or more consumer-readable communications for communicating some or all of the transaction information to the consumer;
    instructions for communicating some or all of the transaction information to the consumer using one or more consumer-readable communications;
    instructions for receiving consumer input in response to the one or more consumer-readable communications proximate the mobile device; and
    instructions for communicating the consumer input from the mobile device to the payment terminal.

49. The computer program product of claim 48 wherein the instructions for producing one or more consumer-readable communications comprise instructions for producing one or more consumer-readable communications selected from the group consisting of an audible communication, a visual communication, a tactile communication, a smell-stimulating communication and a taste-stimulating communication.

50. The computer program product of claim 48 wherein the computer-executable program code further comprises instructions for providing the consumer an option to interact directly with the payment terminal, the option to interact indirectly with the payment terminal through the mobile device, or the option to interact both directly with the payment terminal and indirectly with the payment terminal through the mobile device.

\* \* \* \* \*